United States Patent

Adolph et al.

[11] Patent Number: 6,081,295
[45] Date of Patent: *Jun. 27, 2000

[54] METHOD AND APPARATUS FOR TRANSCODING BIT STREAMS WITH VIDEO DATA

[75] Inventors: Dirk Adolph, Ronnenberg; Dietrich Westerkamp, Hemmingen; Carsten Herpel, Hanover; Ingo Hütter, Celle, all of Germany

[73] Assignee: Deutsche Thomson-Brandt GmbH, Villigen-Schwenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/427,086

[22] Filed: Apr. 21, 1995

[30] Foreign Application Priority Data

May 13, 1994 [DE] Germany .............................. 44 16 967

[51] Int. Cl.[7] .............................. H04N 7/12; H04N 11/02; H04N 11/04
[52] U.S. Cl. .......................... 348/405; 348/414; 348/422; 375/245
[58] Field of Search .................................. 348/402, 405, 348/409, 410, 412, 413, 414, 423, 418, 461, 462, 463, 845; 382/238; 341/76; 364/514 C; 375/245; H04N 7/12, 11/02, 11/04

[56] References Cited

U.S. PATENT DOCUMENTS

| | | | |
|---|---|---|---|
| 5,231,484 | 7/1993 | Gonzales et al. | 348/405 |
| 5,334,977 | 8/1994 | Kato | 341/76 |
| 5,537,440 | 7/1996 | Eyuboglu et al. | 375/245 |
| 5,541,852 | 7/1996 | Eyuboglu et al. | 364/514 C |
| 5,544,266 | 8/1996 | Koppelmans et al. | 382/238 |
| 5,617,142 | 4/1997 | Hamilton . | |

FOREIGN PATENT DOCUMENTS

| | | | |
|---|---|---|---|
| 0327982 | 8/1989 | European Pat. Off. | H04N 7/01 |
| 0596423 | 1/1993 | European Pat. Off. | H04N 7/13 |
| 0575201 | 12/1993 | European Pat. Off. . | |
| 0575201A2 | 12/1993 | European Pat. Off. | H04N 7/137 |
| 0579514 | 1/1994 | European Pat. Off. | H04N 7/13 |
| 0627858 | 12/1994 | European Pat. Off. | H04N 7/13 |
| 0637893 | 2/1995 | European Pat. Off. | H04N 7/26 |
| 3510902 | 10/1986 | Germany . | |
| 351092C2 | 1/1989 | Germany | H03M 7/40 |
| 94/23536 | 10/1994 | WIPO . | |

OTHER PUBLICATIONS copy of German search report from Germany & Austria.

Draft Revision of Recommendation H.261:Video Codec for Audiovisual Services At ½ ×64 kbit/s— Dec. 1, 1989.

The Digital Hierarchy—A Blueprint for Television in the 21st Century—Reitmeier et al.—SMPTE Journal, Jul. 1992.

*Primary Examiner*—Tommy P. Chin
*Assistant Examiner*—Nhon T. Diep
*Attorney, Agent, or Firm*—Joseph S. Tripoli; Peter M. Emanuel; Frederick A. Wein

[57] ABSTRACT

The coding or decoding of video data with the associated audio and/or other data can be performed, for example, on the basis of the standards ISO/IEC 11172 (MPEG1) or ISO/IEC 13818 (MPEG2). Such coding and decoding can include the conversion of a primary bit stream coded on the basis of such standards into a secondary bit stream with a different data rate. Since the information content of the motion vectors from the primary bit stream retain their validity in the secondary bit stream, it is not necessary to recalculate motion vectors for transcoding. Instead, encoding of the secondary bit stream is performed with the aid of the motion vectors from the primary bit stream which are reused. In such a case, the encoding of the secondary bit stream is carried out in a restricted prediction mode, i.e. only those prediction modes which are described by respective block type or the motion information of the primary bit stream are allowed in the secondary bit stream.

7 Claims, 1 Drawing Sheet

METHOD AND APPARATUS FOR TRANSCODING BIT STREAMS WITH VIDEO DATA

The present invention relates to a method and apparatus for transcoding bit streams which contain video data with motion information.

BACKGROUND

The coding or decoding of video data with associated audio and/or other data can be performed, e.g., on the basis of the standards ISO/IEC 11172 (MPEG1) or ISO/IEC 13818 (MPEG2). In some cases, it is desirable to convert a bit stream coded on the basis of such standards into a bit stream with a different data rate. It is known from the standard ISO/IEC 13818-2, subclause 7.8, "SNR scalability", to generate for this purpose a data stream with two layers, i.e., a corresponding decoder processing either only one layer with low resolution or both layers with an increased resolution. In such a case, the second layer additionally contains DCT coefficients to represent the increased spatial resolution. However, the coding in such a case must already generate a spatial layer and there is obtained a bit stream to be decoded which has only two possible, fixed data rates or resolutions.

To permit other data rates as well, during the transcoding of the digital video bit stream, a processing of the primary bit stream should take place in such a way that a lower data rate of the secondary bit stream is possible along with simultaneous high picture quality. The best picture quality is achieved by a decoding of the primary bit stream and subsequent encoding into a secondary bit stream. However, extensive hardware is required for this purpose.

Accordingly, it is an object of an aspect of the present invention to specify a method for transcoding bit streams with video information including motion information, in which the output data rate or resolution can be varied within broad limits and in which only a minimal amount of hardware is required.

Data-reducing coding methods for video signals often use motion prediction in conjunction with a corresponding motion interpolation. For this purpose, motion vectors are determined for picture-element blocks or macroblocks respectively comprising a plurality of picture-element blocks. Depending on the type of these blocks or video data, e.g., field, I, P or B, numerous prediction modes are possible. For achieving an optimum coding, all these modes are taken into consideration.

The method and apparatus according to the present invention is based upon the reuse of motion-compensating prediction vectors of the primary bit stream in the secondary bit stream. Since the information content of the motion vectors from the primary bit stream retains its validity in the secondary bit stream, it is not necessary to recalculate motion vectors for transcoding. Instead, an encoding of the secondary bit stream is performed with the aid of the motion vectors from the primary bit stream. In this case, the encoding of the secondary bit stream is carried out in a restricted prediction mode, i.e. in the secondary bit stream only prediction modes which are described by the respective block type or the motion information of the primary bit stream, are authorized. The postprocessing of the prediction error, e.g., quantization, which on account of the altered data rate is likewise altered, is adjusted adaptively to the desired target data rate. Consequently, a lower data rate can also actually be ensured. The delay of the overall signal by the required processing time for the bit stream transcoding is also advantageously reduced by the present invention in comparison with a complete decoding/encoding.

The video signals may comprise luminance and/or chrominance signals. In principle, the method according to the invention for transcoding a bit stream with video data, to which motion information and video data type information are assigned, from a first data rate into a second data rate comprises of the incoming video data corresponding to the first data rate, are at least partially decoded with the aid of the motion information and video data type information obtained therefrom, and are encoded using the same motion information and video data type information into the video data corresponding to the second data rate, i.e., a motion prediction and interpolation in which the number of possible prediction modes is restricted to the prediction modes allowed for the respective video data type being used for the encoding.

In principle, the device according to the invention for transcoding a bit stream with video data, to which motion information and video data type information are assigned, from a first data rate into a second data rate, is provided with:

buffer-storing means and analyzing means, which obtain the motion and video data type information from the video data;

followed by video data decoding means, assigned to the first data rate, which include motion prediction and motion interpolation means controlled by the motion and video data type information;

followed by video data encoding means assigned to the second data rate which include motion prediction and motion interpolation means controlled by the same motion and video data type information, and in which the number of possible prediction modes is restricted to the prediction modes allowed for the respective video data type.

BRIEF DESCRIPTION OF THE DRAWING

Reference may be had to aspects of the exemplary embodiments of the present invention which are described with reference to the drawing, which shows a transcoder according to aspects of the present invention.

DETAILED DESCRIPTION OF THE PREFERRED EMBODIMENTS

Figure 1:
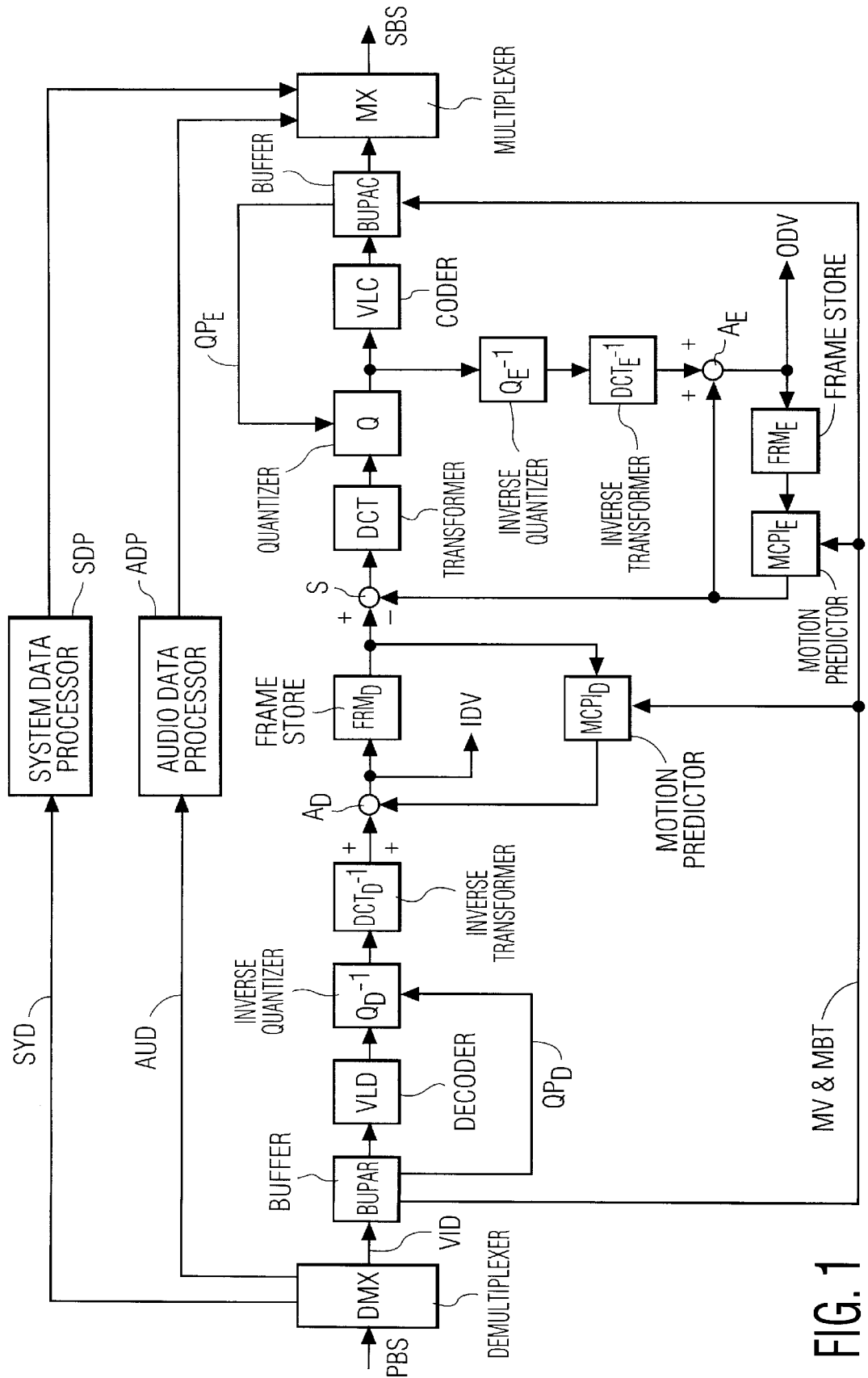

The transcoder in FIG. 1 receives a primary bit stream PBS with a first data rate and emits a secondary bit stream SBS with a second, usually lower data rate. The bit stream PBS is separated in a demultiplexer DMX into system data SYD, audio data AUD and video data VID. The inverse operation takes place at the output in a multiplexer MX. SYD and/or AUD can, if need be, likewise be adapted to the second data rate in a corresponding system data processor SDP or an audio data processor ADP, respectively. The primary bit stream PBS is partially decoded and subsequently re-encoded. The video data VID are fed for partial decoding to a buffering and analyzing circuit BUPAR, which separates motion information, e.g., motion vectors, block type information MV&MBT, and quantization parameters $QP_D$, and passes on the buffer-stored video data via a variable length decoder VLD, an inverse quantizer $Q_D^{-1}$ controlled by $QP_D$, an inverse DCT transformer circuit $DCT_D^{-1}$, an adder $A_D$ and via frame-storing means $FRM_D$ to the encoder part of the transcoder.

With a motion predictor and interpolator $MCPI_D$, the picture signals stored in $FRM_D$ are coupled to and, in the case of interframe-coded or interfield-coded picture-element blocks/macroblocks, are added in adder $A_D$ to the picture data. The decoded input video signal IDV is available at the output of $A_D$. The motion predictor and interpolator $MCPI_D$ is controlled by the motion and block type information MV&MBT. The input signal of the encoder part is fed, via a subtractor S, a DCT transformer circuit DCT, a quantizer Q, a variable length coder VLC, and a buffering and packet-forming circuit BUPAC, to the multiplexer MX together with the output signals of SDP and ADP. The circuit BUPAC controls the quantizer Q and inserts the motion and block type information MV&MBT into the video bit stream.

The output signal of the quantizer Q runs, via an inverse quantizer $Q_E^{-1}$, an inverse DCT transformer circuit $DCT_E^{-1}$, an adder $A_E$, frame-storing means $FRM_E$ and a motion predictor and interpolator $MCPI_E$, to an inverting input of subtractor S. The output signal of $MCPI_E$ is additionally coupled to a second input of adder $A_E$. The motion predictor and interpolator $MCPI_E$ is also controlled by the motion and block type information MV&MBT. The motion-estimating hardware which would be required in the case of complete encoding, is not needed here. The decoded output video signal ODV is available at the output of $A_E$. According to aspects of the present invention, in the motion prediction in $MCPI_E$, only prediction modes which are described by the respective block type or the motion information MV&MBT of the primary bit stream are allowed. The prediction error, optionally altered on account of the altered data rate, is adapted by a correspondingly altered quantization characteristic in Q and $Q_E^{-1}$ to the desired target data rate.

If MPEG2 coding has been used, the following relationships apply, for example, between MV&MBT and prediction mode (for the definition of P, I and B pictures, see ISO/IEC 13818-2, subclauses I.4.1.1 and 6.1.2.4; for the definition of picture types or block types and prediction modes, see ISO/IEC 13818-2, 25 subclause 7.6):

field picture:
   frame prediction not allowed;
frame picture:
   16*8 prediction not allowed;
I pictures and B pictures:
   dual prime prediction not allowed;
P pictures, skipped macroblocks:
   no prediction (motion vector is set to 0);
B pictures, skipped macroblocks:
   prediction remains unchanged (corresponding existing motion vectors continue to be used).

The decoder part may be constructed, for example, similarly to that shown in the article by Martin Bolton, "Chip, Chip hurra", Funkschau 24/1993, pp. 76–81, using the MPEG decoder integrated circuit STi3240 and the DCT processor integrated circuit STV3208, both products of the SGS-Thomson Company of France. An MPEG/H.261 decoder Sti3400 or an MPEG2/CCIR601 video decoder STi3500 may also be used as the decoder chip. The MPEG/H.261 encoders STi3230 or STi3400 may be used for the encoder portion.

The present invention can be used, for example, in digital picture reproduction equipment or picture recording equipment, in video telephone systems, in television studios, in television signal feeding systems, for distribution in cable networks or for satellite transmission systems.

We claim:

1. A method for transcoding a block based, variable length coded, quantized, DCT transformed, compressed bit stream of video data and which includes motion vectors and compression mode information, said method comprising;

receiving the compressed bit stream of video data;
   separating motion vectors and mode information from the bit stream of video data;
   variable length decoding blocks of data in the bit stream of video data to produce non-variable length coded data;
   inverse quantizing the non-variable length coded data to produce blocks of non-quantized DCT coefficients;
   applying non-quantized DCT coefficients to a quantizer and quantizing said DCT coefficients to produce blocks of quantized coefficients which are quantized differently than corresponding original blocks of received video data;
   variable length coding the said produce blocks of quantized coefficients; and
   multiplexing variable length coded said blocks of quantized coefficients with associated separated said motion vectors and mode information to provide a transcoded bit stream of video data of different volume than received said bit stream of video data.

2. The method set forth in claim 1 further including the steps:

inverse transform processing said non-quantized DCT coefficients to produce blocks of pixel residue values;
   motion compensation processing said pixel residue values using said separated said motion values and mode information to produce a decompressed video signal;
   using said motion vectors, said mode information and quantized coefficients from said quantizer to generate predicted video signal;
   subtracting said predicted video signal from said decompressed video signal to produce pixel residues; and
   DCT transforming said pixel residues to produce blocks of DCT coefficients.

3. The method set forth in claim 2 wherein respective said blocks of DCT coefficients have corresponding blocks in received said bit stream of video data, and which blocks of DCT coefficients may be generated by a different compression mode than corresponding blocks in received said bit stream of video data.

4. Apparatus for transcoding a block based, variable length coded, quantized, DCT transformed, compressed bit stream of video data which includes motion vectors and compression mode information, said apparatus comprising:

an input for receiving said video data;
   a demultiplexer for separating motion vectors and mode information from received said video data;
   a cascade connection of a variable length decoder and an inverse quantizer coupled to said demultiplexer;
   a cascade connection of a quantizer and variable length coder coupled to said inverse quantizer;
   a multiplexer coupled to said variable length coder and said demultiplexer for combining separated said motion vectors and mode information with associated coded video data provided from said variable length coder to produce a block based, variable length coded, quantized DCT transformed, compressed bit stream of video data including motion vectors and compression mode information, wherein said compressed bit stream of video data is more coarsely quantized than received said video data.

5. The apparatus set forth in claim 4 further including:

an inverse DCT transform circuit coupled to said inverse quantizer; and

A DCT transform circuit coupled between said inverse DCT transform circuit and said cascade connection of a quantizer and variable length coder.

6. The apparatus set forth in claim 5 further including:

a motion compensated decoder coupled to said inverse DCT transform circuit;

a subtractor having a first input port coupled to an output port of said motion compensated decoder, and output port coupled to an input port of said DCT transform circuit, and having a second input port; and a motion compensated predictor having an input port coupled to an output port of said quantizer, an output port coupled to the second input port of said subtractor, and responsive to separated said motion vectors and mode information for generating a predicted video signal, which predictor may use a different prediction mode than respective modes included in the mode information.

7. A method for transcoding a bit stream with video data, to which motion information and video data type information are assigned, from a first data rate into a second data rate, comprising:

at least partially decoding incoming video data corresponding to said first data rate using the motion information and video data type information obtained therefrom; and re-encoding at least partially decoded said incoming video data into video data corresponding to the second data rate, using said motion information and video data type information, wherein the signal standard of the second data rate video data corresponds to the signal standard of the first data rate video data, and wherein during re-encoding different motion interpolation and motion prediction modes may be implemented than motion interpolation and prediction modes implemented in encoding the incoming video but restricted to modes which can be generated by said partial decoding from the actual prediction modes of the incoming video data.

* * * * *